United States Patent [19]

Fieber

[11] Patent Number: 5,287,844
[45] Date of Patent: Feb. 22, 1994

[54] VERSATILE CAMP GRILL

[76] Inventor: Ted L. Fieber, 875 Rd. 10, Powell, Wyo. 82435

[21] Appl. No.: 18,170

[22] Filed: Feb. 16, 1993

[51] Int. Cl.⁵ .............................................. F24B 3/00
[52] U.S. Cl. .................................. 126/30; 248/188.7; 248/165
[58] Field of Search ................ 126/29, 30; 248/188.7, 248/165

[56] References Cited

U.S. PATENT DOCUMENTS

| | | | |
|---|---|---|---|
| 1,895,794 | 1/1933 | Hayden | 248/165 |
| 3,838,838 | 10/1974 | Seaman | 248/188.7 |
| 4,856,423 | 8/1989 | Burns | 126/30 |
| 4,932,391 | 6/1990 | Bierdeman | 126/30 |

Primary Examiner—Carroll B. Dority
Attorney, Agent, or Firm—Risto Rinne; Douglas Clarkson

[57] ABSTRACT

A campfire grill for cooking over an open fire is described as including a base support assembly with a plurality of legs extending away from an upright member. The upright member is of a predetermined height with a cooking implement support knob slidable along the upright member and lockable in a desired position. Cooking implements are interchangeably attached to the support knob for a cooking activity at the desired height above the campfire. A flange is described between the lower end of the upright member and the legs permitting the cooking implement and the upright member to be turned readily as an additional control over the temperature from the campfire.

20 Claims, 1 Drawing Sheet

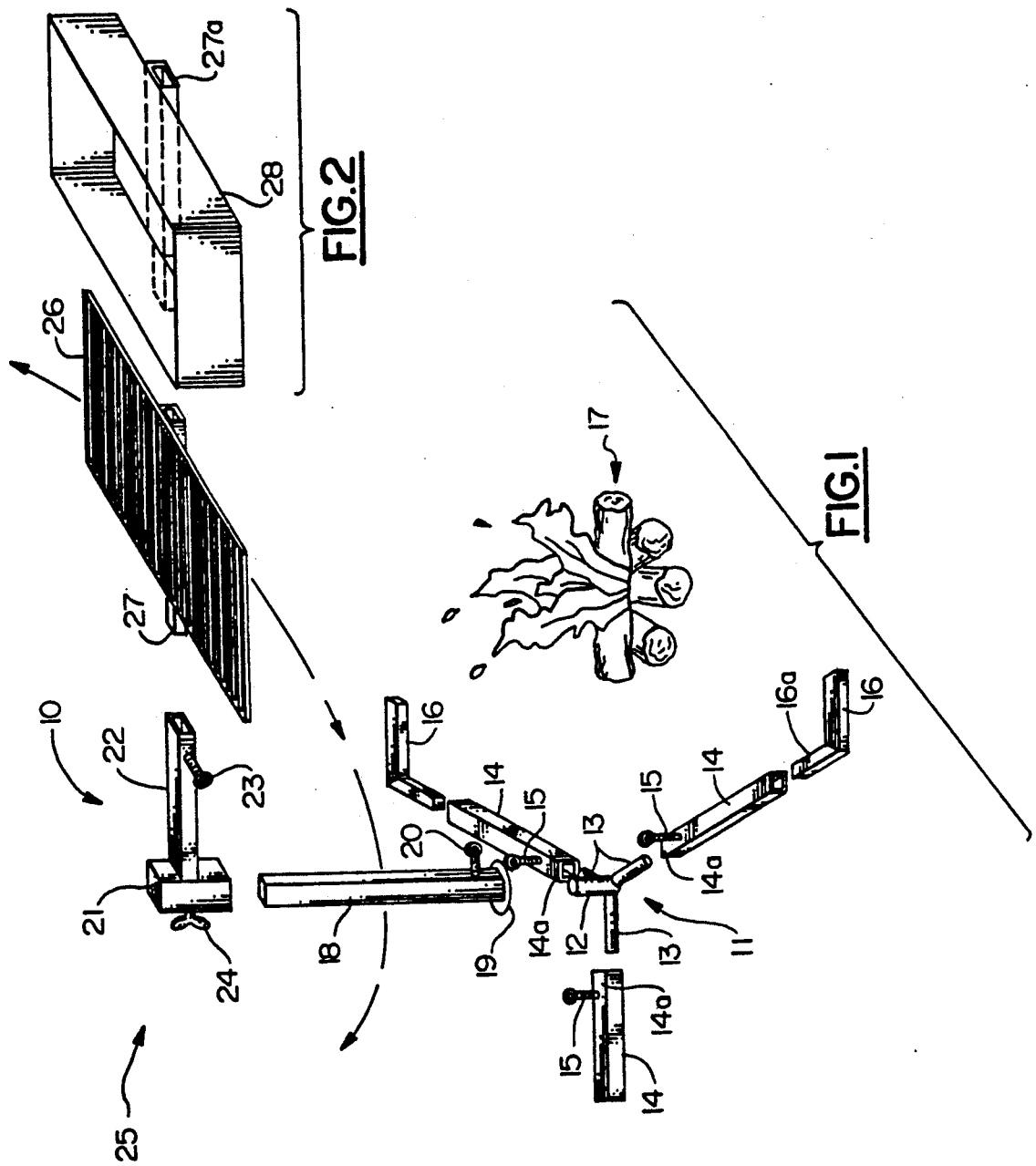

VERSATILE CAMP GRILL

BACKGROUND OF THE INVENTION

1. Field of the Invention

The present invention, in general, relates to cooking apparatus and, more particularly, to devices for cooking foods about a campfire.

The cooking of food about a campfire is, for many people, the essence of the camping experience. It matters little whether the campfire is located in remote back-country accessible only by foot or is located immediately alongside a motor home. The simple act of cooking foods out of doors about an open fire brings pleasure to many people.

However, as many people discover, it is not as easy to cook food about an open campfire in practice as it appears to their imagination. It is difficult, for example, to control the cooking temperature. Food cooked over a campfire will often cook either too slowly or burn if it is allowed to cook to quickly.

Once certain food items have been properly heated, it is difficult to maintain those food items at an ideal serving temperature while preparing other food items.

It is also inconvenient generally to serve food that has been cooked over a campfire as the bottom of the cooking implements are hot and soot covered. Therefore, while food is being served, it is desirable to be able to leave the cooking implements resting on the same surface used during heating but without continuing to further heat the food.

Certain food items that are cooked over a campfire are best prepared over an open grill surface, such as hot dogs and hamburgers. Certain other food items, such as soups and stews, require a container or pot. Still other food items, such as fried eggs, are best prepared using a griddle type of cooking surface.

Accordingly, there exists today a need for a versatile camp grill that is portable, provides for easy control of the cooking temperature, is able to maintain food at the desired temperature, is able to hold pots, pans, and food items without heating them further, and can accommodate different types of cooking surfaces.

2. Description of Prior Art

Campfire grills are known. For example, the following U.S. patents describe various types of camp and barbecue grills:

U.S. Pat. No. 2,604,884 to Walker, Jul. 29, 1952;

U.S. Pat. No. 2,827,846 to Karkling, issued Mar. 25, 1958;

U.S. Pat. No. 4,083,354 to Claire et al., issued Apr. 11, 1978;

U.S. Pat. No. 4,532,912 to Burnside, issued Aug. 6, 1985;

U.S. Pat. No. 4,553,525 to Ruble, issued Nov. 19, 1985;

U.S. Pat. No. 4,607,608 to Allred et al., issued Aug. 26, 1986;

U.S. Pat. No. 4,724,753 to Neyman et al, dated Feb. 16, 1988;

U.S. Pat. No. 4,856,423 to Burns, issued Aug. 15, 1989;

U.S. Pat. No. 4,979,490 to Nudo et al., issued Dec. 25, 1990; and

U.S. Pat. No. 5,117,806, that issued Jun. 2, 1992.

While the structural arrangements of the above described devices, at first appearance, have similarities with the present invention, they differ in material respects. These differences will be described in more detail hereinafter.

OBJECTS AND SUMMARY OF THE INVENTION

It is an important object of the present invention to provide a camp grill that is portable.

It is also an object of the invention to provide a camp grill that provides easy control of the cooking temperature.

Another object of the invention is to provide a camp grill that can readily accept a variety of cooking surfaces.

Yet another object of the invention is to provide a grill that can be assembled and disassembled easily and readily for carrying.

Briefly, a versatile camp grill for cooking over a campfire, that is constructed in accordance with the principles of the present invention, has a base assembly for accepting stabilizing legs and an upright member that is capable of rotating. A grill support is attached to the upright member to which a variety of cooking surfaces are supported. The entire camp grill assembly is constructed to be assembled quickly and easily.

BRIEF DESCRIPTION OF THE DRAWINGS

FIG. 1 is an exploded view of the versatile camp grill to illustrate the various component parts and how they interrelate.

FIG. 2 illustrates a modified attachment.

DETAILED DESCRIPTION OF THE INVENTION

Referring to FIG. 1, an exploded view of a versatile camp grill is identified generally by the numeral 10. A base assembly, identified in general by the numeral 11, has a short upright post 12 and three radially extending posts 13.

An extension 14 is formed to slide over each of the posts 13 and fastened by a thumb screw 15. The length and configuration of the extensions 14 are variables to accommodate readily almost any size and load handling ability that may be desired for each model of the camp grill 10.

Each of the component parts is constructed from a variety of different shaped materials for an easier identification of the respective components. Each component part, of course, corresponds in its shape with the part with which it cooperates.

For example, the posts 13 can be formed from square or rectangular material permitting the extensions 14 to slide readily over the posts 13. Clearly, the extensions 14 can slide into the posts 13 rather than over them, and the extensions 14 can have an outer configuration that is square or rectangular, while the inner opening can be circular to receive round posts 13.

End stabilizers 16 are inserted into the ends of the extensions 14 to provide additional stability. The end stabilizers 16 are secured in place either by thumbscrews (not shown) or by a snug friction fit.

For example, if the extensions 14 are square and the end stabilizers 16 are square, but smaller, and capable of fitting into the exposed end of the extension, each stabilizer 16 is prevented from turning. In such an arrangement, a thumbscrew is optional.

A preferred arrangement relies upon the use of two stabilizers 16, each one having a single change in direction, as shown by angle 16a. The two stabilizers 16 are placed so as to surround a campfire 17.

This provides for a greater stability of the grill 10 when loaded with foodstuffs and cooking implements, and when turned, an additional stabilizer 16 can be used with the third extension 14, particularly when needed for more stability. Extra extensions can be provided to be assembled with those extensions 14 for still greater stability, if needed also.

The components of the camp grill 10 are constructed to permit easy field assembly and disassembly. The grill 10 normally is stored and transported in a substantially disassembled condition, and it is assembled for use when needed at the campfire 17.

An upright member 18 of any convenient shape and length has a flange 19 extending laterally at its lower end to rest on the top end surface 14a of the extensions 14. The inside diameter of the upright member 18 is slightly larger than the outside diameter of the upright post 12.

Square tubing is preferred for the grill 10, particularly for the upright member 18. This permits the upright member 18 to be more readily grasped with the hand for turning, as will be described in more detail presently.

The flange 19 permits the upright member 18 to be placed over and to slide down along the length of the upright post 12 until the flange 19 comes to rest on the top end surface 14a of each of the extensions 14. The top end surface 14a is that portion of each extension 14 between the upright post 12 and a thumbscrew 15.

Of course, the flange 19 may be replaced by having the bottom of the upright member 18 rounded slightly so as not to be too abrasive as it turns on the end surfaces 14a, or when they are not close against the upright member 18, as it turns on the upper surface of each of the posts 13.

An advantage of the flange 19 is realized when one of the extensions 14 is not sufficiently close to the upright member 18, creating a gap that is readily bridged by the flange 19. This type of a mechanical arrangement, using a flange 19, permits the smooth and continuous pivoting of the upright member 18 over any desired arc, even to a rotation of 360 degrees, thereby providing a control over the temperature from the fire 17.

A thumbscrew 20 at the lower end of the upright member 18 is tightened to prevent the upright member 18 from turning once it is in a desired position.

An upper support knob 21 is of any desired shape and size with inside dimensions that are slightly larger than the outside of the upright member 18. A support 22 for the grill 26 extends from the upper support knob 21 a desired length and has a thumbscrew 23 near an end furthermost from the knob 21.

The knob 21 passes over the upright member 18 and, being open at its upper and lower ends, is slidable along the length of the upright member 18. A wing nut 24, when tightened, bears against the upright member 18 to secure the knob 21 a desired distance above the campfire 17.

The support 22 with the thumbscrew 23 and the support knob 21 with the wing nut 24 form a grill support assembly 25. This arrangement of the grill support assembly 25 permits the cooking of food in the desired type of cooking vessel on various cooking surfaces at various heights above the campfire 17.

As described herein, the term "thumb screw" identifies a threaded member with an enlarged, flat end for grasping between the forefinger and the thumb for turning. A preferred thumb screw has an opening permitting an elongated object, like a pencil, even a stick or twig, to be inserted for additional torque when turning. In contrast, a "wing nut" is a threaded member with arcuate flared ends for grasping between the forefinger and thumb to apply far more torque more easily and more readily when turning.

A grill surface 26 is attached to a grill tube 27. The thumbscrew 23 is tightened to secure the grill tube 27 and grill surface 26 in position.

The grill surface 26, preferably, is affixed to the grill tube 27. This arrangement permits the interchange of cooking surfaces more easily and more quickly when it is so desired.

Other types of cooking surfaces or cooking implements are attached to similar tubes 27 for use in place of the grill surface 26, when desired.

In FIG. 2, a container 28 is shown as one type of cooking implement that is attached to a second grill tube 27a and is inserted in the support 22 when an open top, kettle-type of cooking implement is needed instead of a grill-type surface. A griddle surface (not illustrated) is attached to its own grill tube, as are a variety of other and different types of cooking implements.

According to a modification to which the arrangement of the invention is adaptable, the grill tube 27 is eliminated, and a desired cooking surface is attached directly to, either the support assembly 25, or to the support 22.

In use, the component parts of the grill 10 are assembled as described, and the grill 10 is positioned about a campfire 17. The wing nut 24 is loosened and the knob 21, the support 22, the grill surface 26, and the grill tube 27 are positioned along the upright member 18 to the desired height above the campfire 17.

The thumbscrew 20 is loosened to rotate the upright member 18 and the grill 26 to a position relative to the fire 17 and, then, is tightened to prevent any further movement during cooking.

When a food being prepared attains a desired temperature, the thumbscrew 20 is loosened and the grill surface 26 is rotated slightly away from the campfire 17. The thumbscrew 20 is tightened as necessary to secure the grill surface 26 in the new position.

This type of partial rotation of the grill surface 26 relative to the campfire 17 moves a portion of the grill 26 away from the campfire 17, permitting foods remaining directly over the campfire to continue cooking, while keeping those food items warm that have been moved away from the campfire 17. Food items, it is observed, are either located directly on the grill surface 26 o in pots and pans placed upon the grill surface 26.

Campfires do not produce heat at a constant temperature for protracted periods of time, because the amount and type of wood that is available varies. As the heat that is produced diminishes, the wing nut 24 is loosened and the knob 21 with the grill surface 26 is moved to locate the grill 26 lower, closer to the campfire. The wing nut 24, then, is tightened to secure the new position.

Similarly, when less heat is required for cooking, the entire assembly 25 is adjusted to move the grill 26 further from the campfire. The wing nut 24 again is tightened to secure this new position.

After all of the food items have been prepared, the camp grill 10 is used as a serving platform. To do this, the thumbscrew 20 is loosened and the upright member 18, with the grill 26 is rotated approximately 180 degrees away from the campfire 17. The thumbscrew 20, then, is tightened.

The above described maneuvers positions the food, as well as any cooking implements that are resting on the grill surface 26, one-half circle away from the campfire 17 and permits safe access for serving the prepared food from the grill surface 26.

After use, the component parts of the camp grill 10 are disassembled. The various component parts are stored in a container or pouch for compact storage and ease of portability.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A campfire grill for cooking over an open fire, said grill being adaptable to be disassembled for ease in transporting and including adjustments for controlling temperature of a cooking implement relative to said open fire, comprising:
    base support means including an upright member and a plurality of legs flared outwardly away from said upright member;
    said plurality of legs having telescoping sections that can be disassembled from each other and from said upright member;
    said upright member having a predetermined length and outer configuration, and terminating in an upper end and a lower end;
    means permitting said upright member to turn readily relative to said plurality of legs;
    cooking implement support means of a predetermined shape for movement along said upright member; and
    said cooking implement support means including means for locking said cooking implement support means in a selected location on said upright member;
    whereby a predetermined cooking implement is supported by said cooking implement support means in a selected position relative to a campfire.

2. A campfire grill as defined by claim 1, wherein said base support means includes a member having posts extending outwardly for interconnecting said upright member and said plurality of legs.

3. A campfire grill as defined by claim 2 wherein each of said plurality of legs and said upright member includes means for securing to said member having posts.

4. A campfire grill as defined by claim 3 wherein said means for securing includes thumbscrew means.

5. A campfire grill as defined by claim 1 wherein said means for locking said cooking implement support means in a selected position along said upright member includes a wing nut.

6. A campfire grill as defined by claim 1 wherein said cooking implement support means includes means extending a predetermined amount for attaching to a selected cooking implement.

7. A campfire grill as defined by claim 6 wherein said selected cooking implement includes grill means.

8. A campfire grill as defined by claim 6 wherein said selected cooking implement includes container means.

9. A campfire grill as defined by claim 6 including means extending a predetermined amount includes means for securing said selected cooking implement.

10. A campfire grill as defined by claim 9 wherein said means for securing said selected cooking implement includes a thumbscrew.

11. A campfire grill as defined by claim 9 including tube means attached to said selected cooking implement for connecting said selected cooking implement to said means extending a predetermined amount.

12. A campfire grill as defined by claim 11 wherein said tube means includes means for attaching a plurality of cooking implements to said cooking implement support means.

13. A campfire grill as defined by claim 1 wherein said means on said lower end of said upright member includes flange means extending away from said upright member for permitting said upright member to be turned readily.

14. A campfire grill as defined by claim 1 wherein said means on said lower end of said upright member includes a rounded lower end permitting said upright member to be turned with a minimum of resistance.

15. A campfire grill as defined by claim 14 including means for securing said upright member in a selected position relative to said plurality of legs.

16. A campfire grill as defined by claim 1 including extension means detachably connected with predetermined ones of said plurality of legs for stabilizing said campfire grill during use.

17. A campfire grill as defined by claim 16 wherein said extension means includes means extending at a predetermined angle for a predetermined distance to stabilize said upright member.

18. A campfire grill as defined by claim 16 wherein said plurality of legs is three and said extension means is detachably connected with each of said three legs to maximize the stability of said upright member when turned relative to said open fire.

19. A campfire grill as defined by claim 3 wherein said implement support means includes means extending a predetermined amount for detachably securing a selected cooking implement.

20. A campfire grill as defined by claim 2 wherein said means permitting said upright member to turn readily relative to said plurality of legs includes at least one flange means located between said lower end of said upright member and said plurality of legs.

* * * * *